United States Patent [19]

Buchan

[11] Patent Number: 4,842,729
[45] Date of Patent: Jun. 27, 1989

[54] TREATMENT OF LIQUIDS

[75] Inventor: Leon Buchan, Johannesburg, South Africa

[73] Assignee: Control Chemicals (Proprietary) Limited, Johannesburg, South Africa

[21] Appl. No.: 904,172

[22] Filed: Sep. 5, 1986

[30] Foreign Application Priority Data

| Sep. 6, 1985 | [ZA] | South Africa | 85/6860 |
| Feb. 14, 1986 | [ZA] | South Africa | 86/1124 |
| Apr. 25, 1986 | [ZA] | South Africa | 86/3127 |
| Jun. 4, 1986 | [ZA] | South Africa | 86/4176 |

[51] Int. Cl.$^4$ .............................. B01F 1/00; C02F 1/76
[52] U.S. Cl. ................................. 210/198.1; 137/268; 422/263; 422/277
[58] Field of Search ...................... 210/198.1, 199, 205, 210/206, 169, 753, 754, 756; 422/264, 264.3, 274, 278, 263, 276, 277; 137/268

[56] References Cited

U.S. PATENT DOCUMENTS

| 1,216,051 | 2/1971 | Bayley | 422/277 |
| 2,760,820 | 8/1956 | Cirese | 422/279 |
| 2,971,825 | 2/1961 | Kersh | 422/279 |
| 3,495,948 | 2/1970 | Long et al. | 422/279 |
| 3,846,078 | 11/1974 | Brett | 422/264 |
| 3,990,855 | 11/1976 | Cort et al. | 210/169 |
| 4,249,562 | 5/1982 | King | 422/263 |
| 4,252,773 | 2/1981 | Spiegel | 210/169 |
| 4,270,565 | 6/1981 | King | 422/263 |
| 4,331,174 | 2/1981 | King | 422/263 |
| 4,584,106 | 4/1986 | Held | 210/754 |

OTHER PUBLICATIONS

"King Feeder" Installation and Operation Manual.

Primary Examiner—Benoit Castel
Attorney, Agent, or Firm—Curtis, Morris & Safford

[57] ABSTRACT

Apparatus for controllably treating a liquid with a liquid treatment substance includes a body having a first portion providing a container-receiving zone and an opening leading into this zone, as well as a second portion having a liquid inlet and a liquid outlet defining a liquid flow path between them, with the zone being in communication with the liquid flow path. The apparatus also includes a container for a liquid treatment substance. The container comprises a cylindrical sleeve, an end piece closing off a first end of the cylinder sleeve, apertures in the sleeve in proximity to the first end, and seal means between the first end of the sleeve and the aperture. The container is movable from an inoperative position in which the seal means seals fluid tightly against the first portion to prevent liquid passing from the flow path into the aperture, to an operative position in which the first end of the sleeve protrudes at least partially into the flow path. The apparatus further includes bias means inside the body for biassing the first end of the sleeve out of the liquid flow path; actuating means for varying the degree to which the first end of the sleeve protrudes into the flow path; and liquid regulating means inside the body for permitting controlled passage of a slip stream of liquid from the flow passage across the seal means into and out of the inside of the sleeve via the apertures in the sleeve, when the container is in its operative position.

17 Claims, 4 Drawing Sheets

TREATMENT OF LIQUIDS

FIELD OF THE INVENTION

THIS INVENTION relates to the treatment of liquids. It relates in particular to apparatus for controllably treating a liquid with a liquid treatment substance, to a container for use with such apparatus, and to a liquid treatment installation.

SUMMARY OF THE INVENTION

According to a first aspect of the invention, there is provided an apparatus for controllably treating a liquid with a liquid treatment substance, which includes
- a body having a first portion providing a container-receiving zone and an opening leading into this zone, was well as a second portion having a liquid inlet and a liquid outlet defining a liquid flow path between them, with the zone being in communication with the liquid flow path;
- a container for a liquid treatment substance, the container comprising a cylindrical sleeve, an end-piece closing off a first end of the cylindrical sleeve, at least one aperture in the sleeve in proximity to the first end, and seal means between the first end of the sleeve and the aperture, and being movable from an inoperative position in which the seal means seals fluidtightly against the first portion to prevent liquid passing from the flow path into the aperture, to an operative position in which the first end of the sleeve protrudes at least partially into the flow path;
- bias means inside the body for biassing the first end of the sleeve out of the liquid flow path;
- actuating means for varying the degree to which the first end of the sleeve protrudes into the flow path; and
- liquid regulating means inside the body for permitting controlled passage of a slip stream liquid from the flow passage across the seal means into and out of the inside of the sleeve via the aperture in the sleeve, when the container is in its operative position.

The liquid inlet may be aligned with the liquid outlet so that the liquid flow path is linear. The zone or chamber may be of elongate cylindrical form, and may extend orthogonally to the liquid flow path. It may be located between the liquid inlet and the liquid outlet.

The chamber and flow path may be circular in cross-section.

The liquid regulating means may comprise a first skirt-like portion fast with the body and depending beyond the chamber into the flow path in proximity to the inlet opening, and flow restriction means associated with the skirt for permitting the liquid slip stream flow into the container.

The apparatus may include a second skirt-like portion, similar to the other or first skirt-like portion, and also having a flow restriction means, in proximity to the outlet opening, so that the skirt-like portions and sections of the body located between them constitute an extension to the chamber which protrudes into the flow path.

In one embodiment, the or each flow restriction means may comprise an aperture or passageway extending through its skirt-like portions. The passageways in the skirts may be aligned with each other. In another embodiment, the or each flow restriction means may comprise a trough or groove in the inner surface of each of the skirt-like portions, that is the surface of the skirt-like portion with which the basket seal means will engage, so that, when the first end of the container protrudes into the flow path, the seal means is located intermediate the respective ends of the troughs, thereby to permit the slip stream of liquid to pass around the seal means by passing along the troughs. The apparatus may include a stop in or on the body for limiting the distance which the basket can protrude into the flow path.

The bias means may comprise a spring located inside the body, between the liquid inlet and the liquid outlet and aligned with the chamber. The chamber as well as the chamber extension may have the same diameter.

The other or second end of the cylindrical sleeve of the container may also be closed off with an end-piece. The end-piece at the second end of the sleeve may be fixedly attached to the sleeve. The sleeve and end-pieces may be of plastics material, with the end-piece at the second end of the sleeve being integral with, or welded to, the sleeve. This end-piece may have a larger diameter than the sleeve so that it protrudes radially outwardly from the sleeve. The sleeve may be provided with a plurality of the apertures in proximity to its first end; it may be foraminous or apertured in proximity to its first end. Its apertured portion may constitute less than half of the total length of the sleeve, and even less than one fifth its total length, for example about 5–10% of its length.

The seal means may comprose an O-ring of compressible material located in a circumferential groove in the sleeve. The O-ring may comprise an annular body portion as well as a circumferential flange-like portion extending radially outwardly from the body portion.

The apparatus may include a water treatment substance inside the basket, the water treatment substance being dispersable or soluble in the water. The water treatment substance may be in the form of pills located one above the other in the basket. The water treatment substance may contain an active agent capable of rendering water potable.

The active agent may be a halogen-based compound. The substance may be in the form of pills, tablets, granules, or the like. In one embodiment, the chlorine-based compound may be a slow chlorine release compound, such as trichloroisocyanuric acid (TCIA). In another embodiment, the chlorine-based compound may be a rapid chloride release compound, such as calcium hypochlorite. The substance may comprise a tablet as described in Republic of South Africa (RSA) Pat. No. 77/0938, and which includes calcium hypochlorite and chloride of lime. In yet another embodiment, it may comprise an admixture of calcium hypochlorite and stearic acid hydrazide, preferably in the form of a tablet.

In one embodiment, the container may include a peripheral skirt around its first end, the skirt extending away from the first end piece and flaring outwardly, thereby to provide an additional seal means between the basket and the wall of the chamber, when the basket is in its inoperative or retracted position.

The apparatus may also include a support located inside the basket for supporting the pills with clearance from the end-piece at the first end, that is the first end piece. The support may comprise a protrusion protruding from the first end-piece, the protrusion protruding a sufficient distance so that the undersurface of the bottommost tablet resting on it will be located at about the level of, or slightly above, the bottommost edge of the aperture(s) closest to the first end-piece.

Typically, the ratio of the diameter of the container to its length may be between 1:2 and 1:4, for example about 1:3. The apertures may be spaced apart circumferentially, and may be generally square or rectangular, having bottom edges which extend parallel to the first end of the sleeve, or orthogonally to its axis. The apertures may be arranged in a plurality of axially spaced rows, the apertures in one row being located equidistantly from the first end of the sleeve. The row of apertures located closest to the sleeve's first end, may be positioned so that their bottom edges are spaced 0,5 to 2 cm from the base, preferably about 1 cm. The width of the groove accommodating the seal ring may be between 2 and 5 mm, preferably about 3 mm.

The actuating means may include a closure member closing off the chamber opening, closure member comprising a circular cover portion and a peripheral skirt depending from the cover portion, with the skirt adapted to pass around that portion of the body providing the opening to the chamber. The actuating means may also comprise an external screw thread formation on the body around the opening, and a complemental internal screw thread formation on the closure member, the length of the basket being such that it protrudes from the open end of the chamber and abuts against the underside of the cover portion of the closure member.

The apparatus may include seal means located between the screw thread formation on the body portion providing the chamber opening and the free end of the chamber, and adapted to seal fluid tightly against the inner surface of the skirt of the closure member between the internal screw thread formation on the skirt and the cover portion of the closure member. The seal means may comprise a first O-ring of compressible or resilient material, such as rubber, located in a circumferential groove in the body, as well as a second o-ring located around the first o-ring within the groove. The second O-ring may be of less resilient material than the first O-ring, eg of TEFLON (trade name). In one embodiment, the second O-ring may comprise an annular body portion and a circumferential flange-like portion extending radially outwardly from the body portion. In another embodiment, it may comprise an annular body having a peripheral slit so that, on the chamber being pressurized, air will enter the slit thereby causing the ring body to flare open and seal effectively against the closure member.

According to a second aspect of the invention, there is provided a liquid treatment installation which includes:
  apparatus for controllably treating a liquid with a liquid treatment substance hereinbefore described;
  a liquid supply conduit connected to the liquid inlet of the apparatus; and
  liquid shut-off means in the liquid supply conduit upstream of the liquid inlet of the apparatus.

The installation may include pressure indicating means for indicating the liquid pressure between the liquid shut-off means and the apparatus.

According to a third aspect of the invention, there is provided a container for use with apparatus for controllably treating a liquid with a liquid treatment substance and comprising a body having a first portion providing a chamber and having an opening leading into the chamber, as well as a second portion having a liquid inlet and a liquid outlet defining a liquid flow path between them, with the chamber being in communication with the liquid flow path, the container comprising:
  a cylindrical sleeve having first and second ends;
  end-pieces closing off the respective ends of the cylindrical sleeve;
  at least one aperture in the cylindrical sleeve in proximity to its first end;
  seal means between the first end of the sleeve and the apertures for effecting a fluidtight seal between the inside of the first portion of the apparatus body and the sleeve when the basket is located in the cylindrical chamber of the apparatus, with the proviso that the container does not include attachment means for attaching it to the body of the apparatus.

A water treatment substance may be provided inside the sleeve.

According to a fourth aspect of the invention, there is provided a container for use with the apparatus according to the first aspect of the invention, which comprises:
  a cylindrical sleeve having first and second ends, and dimensioned to fit into the container-receiving zone of the apparatus;
  end-pieces closing off the respective ends of the cylindrical sleeve;
  at least one aperture in the cylindrical sleeve in proximity to its first end; and
  seal means between the first end of the sleeve and the apertures for effecting a fluidtight seal between the inside of the first portion of the apparatus body and the sleeve when the basket is located in the container-receiving zone of the apparatus, with the proviso that the container does not include attachment means for attaching it to the body of the apparatus.

BRIEF DESCRIPTION OF THE DRAWINGS

The invention will now be described by way of example with reference to the accompanying diagrammatic drawings.

In the drawings.

DESCRIPTION OF THE PREFERRED EMBODIMENTS

In the drawings, reference numeral 10 generally indicates apparatus for controllably treating or dosing a liquid with a liquid treatment substance, an in-line dispensing or dosing device.

The apparatus 10 includes a T-shaped body, generally indicated by reference numeral 12. The body 12 includes a hollow cylindrical body portion 14, which is circular in cross-section, providing a cylindrical chamber 16. The body portion has, at its free end 15, an opening to the chamber. The body 12 also includes a hollow circular-section cylindrical body portion 18 extending orthogonally to the portion 14 and providing a fluid flow path 20 which is in communication with the chamber 16. The portion 18 has a liquid inlet 22 and a liquid outlet 24, which are aligned linearly with each other.

The apparatus 10 also includes a pair of skirt-like portions 26, 28 located in proximity to the inlet and outlet respectively. In each of the skirt-like portions 26, 28 there is provided a flow-restriction passageway 30 which is substantially oval shaped when seen end-on, as well as smaller circular apertures 31. The edges 27 of the portions 26, 28 around the passageways 30 are bevelled. The skirt-like portions 26, 28, as well as sections of the body portion 18 between them, are shaped so that they provide an extension to the chamber 16, this extension having the same diamter as the chamber 16.

Inside the chamber 16 there is located a container in the form of a cylindrical basket, cartridge or magazine 35. The basket 35 comprises a circular-section cylindrical sleeve 36, and circular imperforate end-pieces 38, 40 closing off the respective ends of the sleeve 36. Typically, the components of the basket may be of plastics material, such as eg LDPE, polystyrene, or the like, and the end-piece 40 may be sonically welded to the sleeve 36. The diameter of the end-piece 40 is greater than that of the sleeve 36 so that it provides a circumferential flange projecting beyond the sleeve 36. Near the end-piece 38, the sleeve 36 is provided with a plurality of apertures 42, it is foraminous, and liquid treatment substance tablets 43 are located inside the basket 35, the tablets being located one above the other.

In another embodiment, the end-piece 40 may clip onto the sleeve 36.

A circumferential groove 44 is provided in the sleeve 35 in proximity to the end-piece 38, and in the groove 44 there is located an O-ring 45 of compressible material, such as polyethylene, optionally containing a lubricant, containing 25% EVA. The O-ring 45 comprises a rectangular section annular body portion 46 from which protrudes radially outwardly from the groove, a circumferential flange-like portion 48. A plurality of protrusions 49 protrude into the inside of the sleeve 36 from the end-piece 38, and they protrude a sufficient distance, about 1 cm, from the end-piece 38 so that the lowermost tablet (not shown) resting on them is located slightly above the level of the bottommost edges 41 of the row of apertures 42 closest to the end-piece 38. The sleeve is provided with axially extending strengthening ribs 47.

Figure 2:
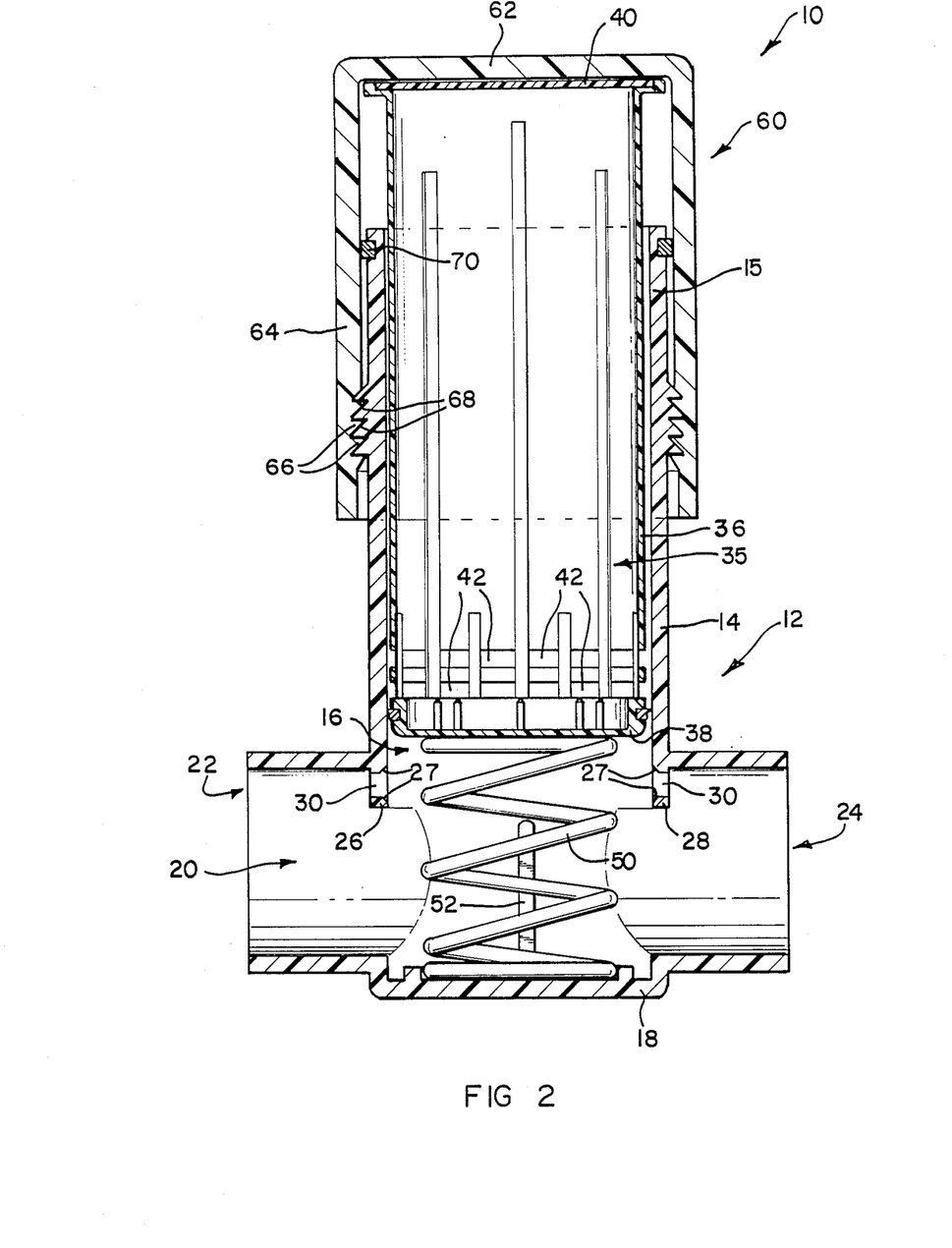
FIG. 2 shows a vertical sectional view of the apparatus of FIG. 1.
Figure 3:
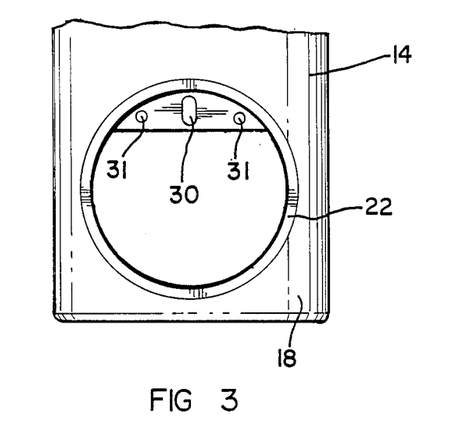
FIG. 3 shows, in part, an end view of the apparatus of FIG. 1, with details omitted for clarity.
Figure 4:
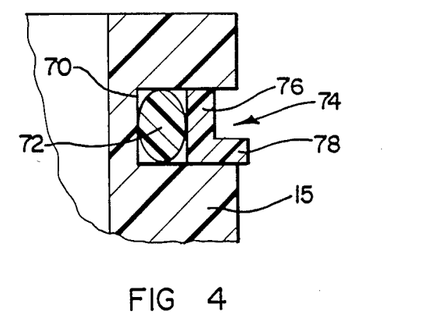
FIG. 4 shows an enlarged view of part of the upper seal means of the apparatus of FIG. 2.

When the basket is then in its inoperative mode as indicated in FIG. 2, the bottommost tablet in the basket will then rest on this supporting member so as to be clear of any liquid in the bottom of the basket. If the bottommost tablet should lie in this liquid, the first volume of liquid dispensed during a subsequent treating mode of operation will have an extraordinary high concentration of the treatment substance in it.

The ring 45 also serves to scrape the chamber wall clean as a used or spent cartridge or basket 35 is removed and a fresh one inserted. The design of the ring 45 permits it to act as a valve, that is liquid drains from the basket 35 when it is in its inoperative position so that the lowermost tablet does then not rest in the pool of liquid in the bottom of the basket, which would lead to wastage. Without wishing to be bound by theory, it is believed that the functioning of the ring 45 to act as a valve in this manner is due to a venturi effect created in the flow path 20 and/or due to a slight pressure build-up in the chamber 16 due to decomposition/dissolution of the pills in the container 35. However, liquid does not enter the basket via the ring 45 when the basket is in its inoperative position.

A spring 50 is located in the portion 18, and abuts against the underside of the end-piece 38. The spring 50 urges the basket 35 out of the flow passage 20. A pair of opposed stops 52 are provided on the inside of the body portion 18, and are adapted to engage the undersurface of the end-piece 38, thereby to limit the distance which the basket 35 can protrude into the passageway. This will ensure that the basket 35 cannot be urged into the flow path to such an extent that the O-ring 45 clears the skirt-like portions 26, 28.

The apparatus 10 also includes a closure member, generally indicated by reference numeral 60. The closure member 60 comprises a circular cover portion 62 and a peripheral skirt 64 depending from the cover portion. The cover portion 64 is provided with an internal screw thread formation 66 which engages a complementary external screw tread formation 68 provided around the body portion 14. Between the screw thread formation 68 and the free end 15 of the body portion 14, there is provided a circumferential groove 70 in which is located a circular section sealing O-ring 72 of resiliently compressible polymeric material, such as rubber. Also located within the groove 70 is an O-ring 74 comprising a ring-like or annular body portion 76 and a circumferential flange-like portion 78 protruding radially outwardly from the body portion 76, and protruding from the groove 70. The ring 74 may be of a less resilient polymeric material, such as TEFLON.

Figure 5:
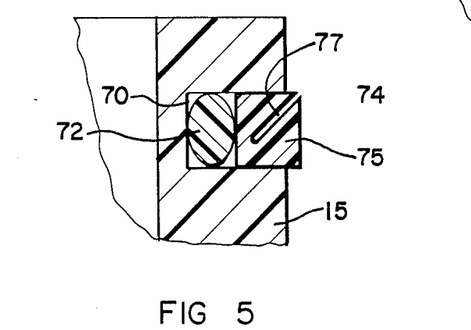
FIG. 5 shows an enlarged view of the same part of the apparatus as shown in FIG. 4, with the upper seal means being in accordance with another embodiment of the invention.

In FIG. 5, it will be seen that, in another embodiment of the invention, the O-ring 74 can comprise only a body portion 75, in which is provided an annular slit or cut 77. In use, pressure air will enter the slit thereby causing the body to expand and seal effectively against the skirt 64.

In use, the basket 35, with the liquid treatment substance tablets located therein, is inserted into the cylindrical chamber 16 until it abuts against the spring 50. The closure member 60 is then screwed onto the body portion 14, and is screwed a sufficient distance onto the body portion 14 against the bias of the spring 50 until the ring 45 moves into register with the passageways 30.

A slip stream of liquid hence passes from the flow path 20, through the aperture 30 in the portion 26, across the ring 45, into and out of basket 35 via the apertures 42, back across the ring 45, and through the aperture 30 in the portion 28, back into the flow path.

In practice it has been found that flange 48 of the ring 45 need not be in register with the apertures 30 for low dosing levels to be achieved. In other words, the flange 48 of ring 45 can be positioned immediately, or from 1 to 5 mm, above the apertures 30 in order to obtain low dosage levels. Without wishing to be bound by theory, it is believed that this is due to the slipstream of water which passes through the upstream aperture 30 deforming the ring 45 sufficiently to pass across it. The ring 45, it is believed, then also functions further as a valve in the manner to permit the liquid to pass back into the flow path, as hereinbefore described. In this fashion, low dosage levels of below 0.5 ppm or about 0,3 ppm, in respect of the liquid in the flow path 20 can be achieved, even at liquid pressures as high as 1000 kPa or more.

By altering the degree to which the ring flange 48 is in register with the passageways 30, or by altering the degree to which the basket protrudes into the flow path 20, the degree of dosing of a liquid stream passing through the flow passageway 20, can be controlled. This control can be effected accurately and effectively with the device 60, due to the infinitely variable adjustments which can be effected by means of the screw thread formations 66, 68.

Figure 1:
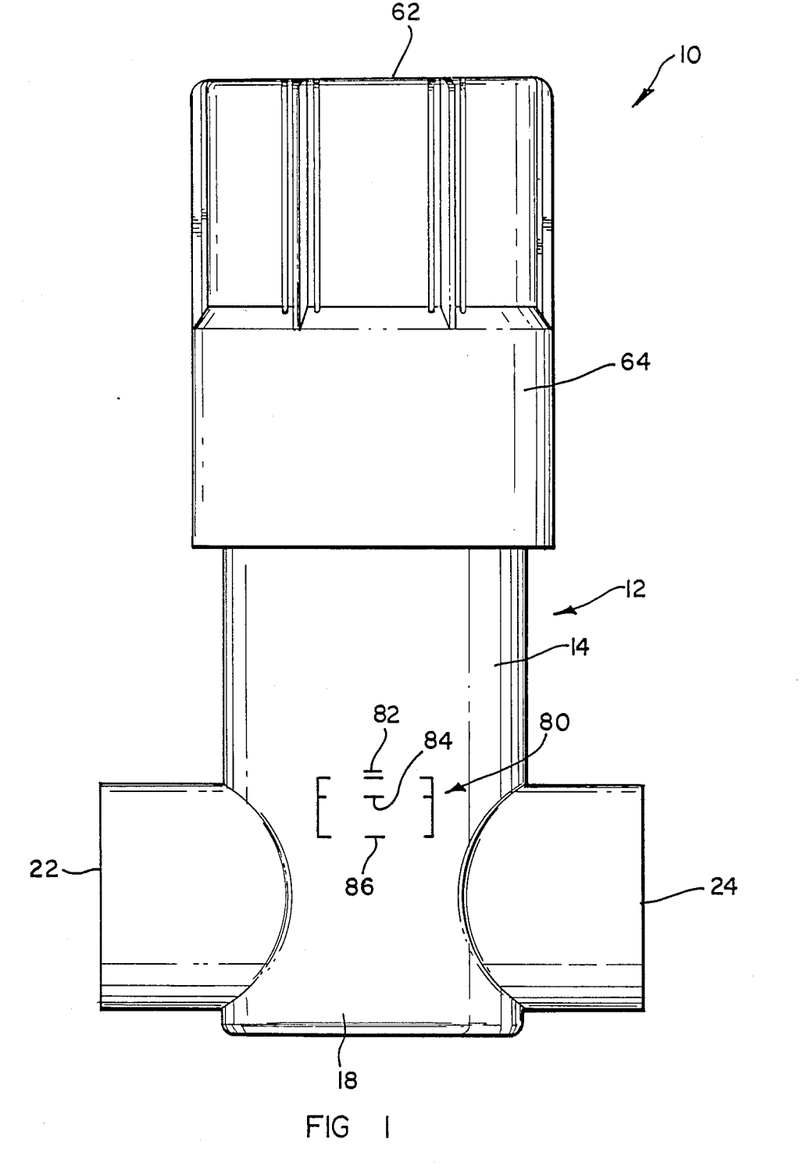
FIG. 1 shows a side view of apparatus for controllably treating a liquid with a liquid treatment substance, according to a first aspect of the invention.

To monitor the degree of dosing, a dosage indicator device 80 is provided, or inscribed on the outside of the body portion 14. The body can hence be of transparent material, such as polycarbonate. When the ring flange 48, which can be coloured so as to be clearly visible, is located opposite an upper limit marking 82, the basket is in its retracted position, as shown in FIG. 1., no dosing is effected. The ring 45 then prevents any liquid flowing along the flow path 20 from passing into the basket. When ring 45 is located opposite and intermediate limit marking 84, the ring flange 48 is still not in register with the passages 30, but a low level of dosing is nevertheless achieved, as described hereinbefore. When the ring flage 48 is located between the marking 84 and a lower marking 86, the flange 48 straddles the apertures 30, so as to achieve higher dosage levels. When the bottom of the container 35 is in register with the marking 86, then a maximum dosage level is achieved, and the container then rests on the stops 52.

The bevelling of the portions 26, 28 around the passageways 30 prevents or reduces damage to the ring 45 as the basket moves along the chamber interior.

The sealing rings 72, 74 between the closure member 60 and the body portion 16 permit air pressure to build up in the chamber 16 as the closure member is screwed onto the portion 14, and liquid flows along the flow path. This air pressure, which is hence in equilibrium with that of any liquid entering the chamber and determines the water level in the chamber, assists in controlling the dosage rate accurately and at low levels due to, it is believed, its assisting in establishing non-turbulent or quiescent liquid flow conditions inside the basket, it damps turbulence. Hence, it hinders excessive water treatment substance attrition, dissolution or entrainment. This effect is believed to be enhanced by closing off the upper end of the basket with the end piece 40, and due to the imperforate nature of the end piece 40.

It is believed that the apparatus 10 will find particular, but not necessarily exclusive, application in the treatment of water, such as chlorine treatment of water. Hence, accurate or controlled chlorine dosage or dispersing can be effected, even at low dosage levels.

The tablets can hence, for treating water such as swimming pool water, be slow-dissolving or -dispersing tablets, containing trichloro isocyanuric acid, or more rapid-dissolving tablets, containing an inorganic chlorine compound, such as calcium hypochlorite. The tablets may also be those described in RSA Pat. No. 77/0938, which is hence incorporated herein by reference, containing calcium hypochlorite and chloride of lime.

Furthermore, since the apparatus has relatively few moving parts which can clog up, tablets which leave an insoluble residue on dissolution can be used.

Figures 6, 8, 9:
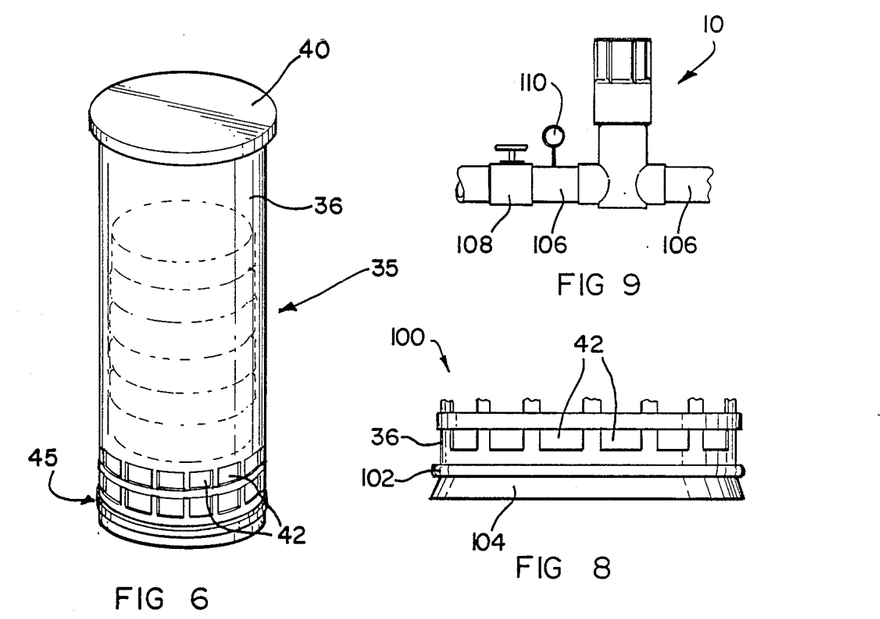
FIG. 6 shows a three-dimensional view of the basket or cartridge of FIG. 2.
FIG. 8 shows a similar side view to FIG. 7, of a container according to another embodiment of the invention.
FIG. 9 shows, schematically, a liquid treatment installation according to the second aspect of the invention, and incorporating the apparatus of FIG. 1.
Figure 7:
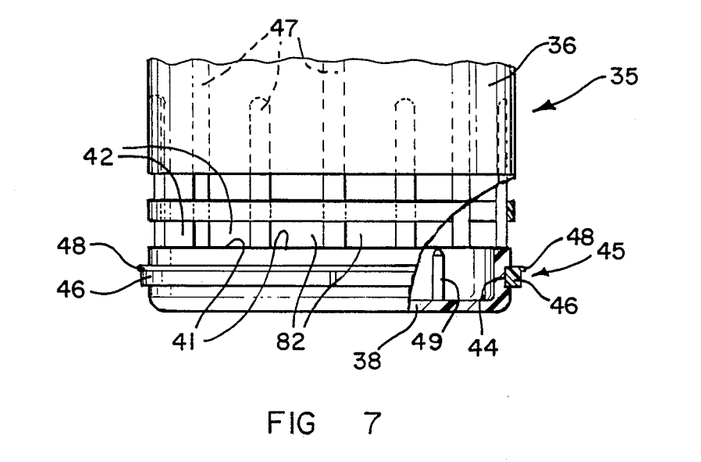
FIG. 7 shows, in part, an enlarged side view of the container of FIG. 6, with a portion cut away for clarity.

The apparatus 10 can be installed in a water flow line 106 with a stop-cock 108 upstream of the apparatus, and a pressure gauge 110 between the stop-cock and the apparatus. The pressure gauge can be used to ensure a constant water pressure which, although believed not to influence dosage rates as significantly as the degree to which the ring flange 48 is in register with the apertures 30, will promote accurate dosage. Pressure regulation is achieved by adjusting the stop-cock or valve.

To remove a spent basket 35, or to replace it with a basket containing a fresh supply of tablets, the stop-cock need merely be closed and the closure member 60 unscrewed. Hence, the apparatus 10 can be reloaded easily and quickly.

The device 10 can hence also easily be cleaned, if it is used to dose dirty water and/or if the chemical substance of the tablets leaves a residue or sludge, merely by removing the cartridge. As a result of the pre-packaging of the baskets, it is also not necessary, on insertion of a fresh basket, for a user to touch or handle the tablets, which can be unhygienic and can cause skin irritation or roughness, depending on the tablet composition, such as when the tablets contain bromine, for rendering impure water potable.

Typically the basket 30 can have the following approximate dimensions:
  diameter: 6 cm
  length: 15 cm
  sizes fo apertures 42: 0,5 × 1 cm
  width of the ring 45: 3 mm
  distance of bottommost edges 41 of bottommost apertures 42 from end piece 38: 1 cm Referring to FIG. 8, reference numeral 100 generally indicates a contained according to another embodiment of the invention. Parts of the basket 100 which are the same or similar to those of the container 35 are indicated with the same reference numerals. A peripheral groove is provided in the sleeve 36 below the apertures 42, and an O-ring 102 is located inside the groove. The basket 100 includes a peripheral skirt 104 extending around its lower end. The skirt 104 flares downwardly outwardly.

The apparatus of the present invention can hence be used to dispense or dissolve a wide variety of chemical substances in a variety of liquids. As hereinbefore described, it can be used to treat or dose swimming pool water with solid hypochlorites such as calcium hypochlorite. It can also be used to treat other waters such as water in bottling plants, water treatment installations, dairies and the like with similar chemicals. It can further be used to treat waste liquids such as sewage, industrial waste or the like, for odour, bacterial and colour control thereof. Still further, it can be used in various other water treatment applications such as treating water with soda ash; sodium fluoride; polyphosphates; aluminium sulphate; chlorine containing compounds other than hypochlorites such as sodium chloride; halogen based compounds such as hydantoins and cyanurates; or the like.

I claim:

1. Apparatus for controllably treating a liquid with a liquid treatment substance, which includes
  a body having a first portion providing a container-receiving zone and an opening leading into this zone, as well as a second portion having a liquid inlet and a liquid outlet defining a liquid flow path between them, with the zone being in communication with the liquid flow path;
a removable closure member closing off the opening to the container-receiving zone;
a container for a liquid treatment substance, the container being located in the container-receiving zone and comprising a cylindrical sleeve, with a first end of the sleeve directed towards the liquid flow path, an end piece closing off the first end of the cylindrical sleeve, and at least one aperture in the sleeve in proximity to its first end, with the sleeve being movable in the container-receiving zone from an inoperative to an operative position;
a compressible ring between the first end of the sleeve and the sleeve aperture, the ring preventing liquid from passing from the flow path into the sleeve aperture when the sleeve is in its inoperative position; liquid regulating means with which the ring cooperates to permit controlled passage of a slipstream of liquid from the flow passage into the inside of the sleeve via the aperture in the sleeve and from the inside of the sleeve, via the aperture, into the flow passage, when the sleeve is in its operative position;
bias means inside the body for biassing the first end of the sleeve out of the liquid flow path; and
actuating means for moving the sleeve from its inoperative position to an operative position.

2. Apparatus according to claim 1, wherein the liquid inlet is aligned with the liquid outlet so that the liquid flow path is linear, with the zone being of elongate cylindrical form and extending orthogonally to the liquid flow path and being located between the liquid inlet and the liquid outlet, and wherein the liquid reglulating means comprises a first skirt-like portion fast with the body and depending beyond the zone into the flow path in proximity to the inlet opening, and flow restriction means associated with the skirt.

3. Apparatus according to claim 2, which includes a second skirt-like portion, similar to the first skirt-like portion, and also having flow restriction means, in proximity to the outlet opening, so that the skirt-like portions and the sections of the body located between them constitute an extension to the zone, which extension protrudes into the flow path.

4. Apparatus according to claim 3, wherein the flow restriction means comprise apertures in the skirt-like portions, the apertures being aligned with each other when the apparatus is seen end-on.

5. Apparatus according to claim 3, wherein the flow restriction means comprises a trough in the inner surface of each of the skirt-like portions so that, when the sleeve is in its operative position, the ring is located intermediate the respective ends of the troughs, so that the slip stream of liquid passes across the ring by passing along the troughs.

6. Apparatus according to claim 3, wherein the bias means comprises a spring located inside the body, between the liquid inlet and the liquid outlet and aligned with the zone, and wherein the zone as well as the zone extension are circular in cross-section and have the same diameter.

7. Apparatus according to claim 6, wherein the other end of the cylindrical sleeve of the container is also closed off with an end piece, which is fixedly attached to the sleeve, and wherein the end piece at the first end of the sleeve is imperforate.

8. Apparatus according to claim 7, wherein the sleeve and end pieces are of plastics material, with the end piece at the other end of the sleeve having a larger diameter than the sleeve so that it protrudes radially outwardly from the sleeve.

9. Apparatus according to claim 6, wherein the ring is located in a circumferential groove in the sleeve, the ring comprising an annular body portion as well as a circumferential flange-like portion extending outwardly from the body portion.

10. Apparatus according to claim 6, which includes a water treatment substance inside the container, the water treatment substance being in the form of pills located one above the other in the sleeve and the apparatus including a support located inside the container for supporting the pills with clearance from the end-piece at the first end of the sleeve.

11. Apparatus according to claim 10, wherein the support comprises a protrusion protruding from the end-piece at the first end of the sleeve, the protrusion protruding a sufficient distance from the end piece so that the bottommost tablet resting on it will be located at about the level of the bottommost edge of the aperture.

12. Apparatus according to claim 6, wherein the closure member comprises a circular cover portion and a peripheral skirt depending from the cover portion, with the skirt adapted to pass around that portion of the body providing the opening to the zone; and wherein the actuating means comprises an external screw thread formation on the body around the opening; and a complemental internal screw thread formation on the inside of the skirt of the closure member, the length of the container being such that it protrudes from the zone opening and abuts against the underside of the cover portion of the closure member.

13. Apparatus according to claim 12, which includes seal means between the screw thread formation on the body portion providing the zone opening, and the zone opening, and adapted to seal fluidtightly against the inner surface of the skirt of the closure member between the internal screw thread formation on the skirt and the cover portion of the closure member, the seal means comprising a first O-ring located in a circumferential groove in the body, as well as a second O-ring located around the first O-ring within the groove 14. Apparatus according to claim 1, wherein the liquid regulating means is included on the first body portion.

15. Apparatus according to claim 1 wherein said container is disposed within said container-receiving zone in the absence of attachment means for attaching said container to said body.

16. A container for use with apparatus of the type comprising a body having a first portion providing a container-receiving zone and an opening leading into this zone, as well as a second portion having a liquid inlet and a liquid outlet defining a liquid flow path between them, with the zone being in communication with the liquid flow path; a removable closure member closing off the opening to the container-receiving zone; liquid regulating means for cooperating with a compressible ring on the container to permit controlled passage of a slip stream of liquid from the liquid flow path into the container; bias means inside the body for biassing the container to an inoperative position out of the liquid flow path; and actuating means for moving the container from its inoperative position to an operative position;, which container comprises
- a cylindrical sleeve having first and second ends and dimensioned to fit into the container-receiving zone of the apparatus;
- end-pieces closing off the respective ends of the cylindrical sleeve;
- at least one aperture in the cylindrical sleeve in proximity to its first end;
- a compressible ring between the first end of the sleeve and the aperture, the ring being adapted to prevent liquid from passing from the flow path of the apparatus into the sleeve aperture when the sleeve is located in its inoperative position in the apparatus, and being further adapted to cooperate with the liquid regulating means of the apparatus to permit controlled passage of a slip stream of liquid from the flow passage into the inside of the sleeve via the aperture in the sleeve and from the inside of the sleeve, via the aperture, into the flow passage, when the sleeve is in its operative position.

17. Apparatus according to claim 16, wherein the container includes a support inside the sleeve for supporting a liquid treatment substance with clearance from the end piece closing off the first end of the sleeve.

18. Apparatus for controllably treating a liquid with a liquid treatment substance, which includes
- a body having a first portion providing a container-receiving zone and an opening leading into this zone, as well as a second portion having a liquid inlet and a liquid outlet defining a liquid flow path between them, with the zone being in communication with the liquid flow path;
- a removable closure member closing off the opening to the container-receiving zone;
- a container for a liquid treatment substance, the container being located in the container-receiving zone and comprising a cylindrical sleeve, with a first end of the sleeve directed towards the liquid flow path, an end piece closing off the first end of the cylindrical sleeve, and at least one aperture in the sleeve in proximity to its first end, with the sleeve being movable in the container-receiving zone from an inoperative to an operative position;
- a compressible ring between the first end of the sleeve and the sleeve aperture, the ring cooperating with the first body portion to prevent liquid from passing from the flow path into the sleeve aperture when the sleeve is in its inoperative position, but to permit controlled passage of a slip stream of liquid from the flow passage into the inside of the sleeve via the aperture in the sleeve and from the inside of the sleeve, via the aperture, into the flow passage, when the sleeve is in its operative position;
- bias means inside the body for biassing the first end of the sleeve out of the liquid flow path; and
- actuating means for moving the sleeve from its inoperative position to an operative position.

* * * * *